United States Patent
De Barros et al.

(10) Patent No.: US 12,353,496 B2
(45) Date of Patent: *Jul. 8, 2025

(54) IDENTIFYING CONTEXTUAL OBJECTS FROM WEB CONTENT

(71) Applicant: Microsoft Technology Licensing, LLC, Redmond, WA (US)

(72) Inventors: Marcelo M. De Barros, Redmond, WA (US); Manish Mittal, Woodinville, WA (US); Vinod Krishnan Koduvayoor Subramanian, Sammamish, WA (US); Prateek Tiwari, Sammamish, WA (US); Ayan Banerjee, Redmond, WA (US); Samir Bathla, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,271

(22) Filed: Jul. 1, 2024

(65) Prior Publication Data
US 2024/0354355 A1 Oct. 24, 2024

Related U.S. Application Data

(63) Continuation of application No. 17/845,410, filed on Jun. 21, 2022, now Pat. No. 12,050,659.

(51) Int. Cl.
*G06F 16/90* (2019.01)
*G06F 16/9538* (2019.01)
*G06F 16/955* (2019.01)

(52) U.S. Cl.
CPC ...... *G06F 16/9558* (2019.01); *G06F 16/9538* (2019.01)

(58) Field of Classification Search
CPC ............ G06F 16/9558; G06F 16/9538; G06F 16/9535
See application file for complete search history.

(56) References Cited

U.S. PATENT DOCUMENTS

| | | | | |
|---|---|---|---|---|
| 9,305,084 | B1* | 4/2016 | McCann | G06F 16/954 |
| 10,217,058 | B2* | 2/2019 | Gamon | G06N 20/00 |
| 2017/0308589 | A1* | 10/2017 | Liu | G06F 16/9535 |

* cited by examiner

*Primary Examiner* — Kristopher Andersen

(57) ABSTRACT

Systems and methods are provided for determining contextual objects related to web content. Web content may include one or more elements, which may be extracted from the web content and analyzed to identify any contextual objects. The web content elements may be hyperlink elements, and contextual objects may be identified based on the hyperlink elements. A dominant entity may be identified for the web content, and contextual objects relating to the dominant entity may be identified. When a request for web content is received, contextual objects may be provided with the requested content. Personalized contextual objects may be selected from the identified contextual objects based on data associated with the request for web content. Selection of a contextual object may result in navigation to a browsing environment associated with the selected contextual object.

20 Claims, 8 Drawing Sheets

500

WEB PAGE

CAROUSEL

| OBJECT 1 | OBJECT 2 | OBJECT 4 | OBJECT 5 |
| | 510 | | |
| | OBJECT 3 | | ❯ |
| 508 | 512 | 514 | 516 |

506

WEB CONTENT

LOREM IPSUM DOLOR SIT AMET LINK 1 TCONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD LINK 2 NON ENIM PRAESENT OBJECTUM FACILISIS LEO VEL FRINGILLA. LUCTUS VENENATIS LECTUS MAGNA FRINGILLA URNA PORTTITOR RHONCUS. NULLA PELLENTESQUE DIGNISSIM LINK 3 TENIM SIT. SUSPENDISSE SED NISI LACUS SED VIVERRA TELLUS IN HAC. ORNARE LECTUS SIT AMET EST PLACERAT.

VITAE SAPIEN PELLENTESQUE HABITANT MORBI TRISTIQUE SENECTUS ET. A DIAM SOLLICITUDIN TEMPOR ID. NETUS ET MALESUADA LINK 4 A LACUS VESTIBULUM. SENECTUS ET NETUS ET MALESUADA FAMES. NUNC SED ID SEMPER RISUS. TORTOR CONDIMENTUM LACINIA QUIS VEL EROS DONEC AC NISI. UT JUSTO LAOREET SIT AMET. SODALES UT ETIAM SIT AMET. LOREM MOLLIS ALIQUAM UT PORTTITOR LEO A DIAM SOLLICITUDIN TEMPOR. NEC TINCIDUNT PRAESENT SEMPER FEUGIAT NIBH LINK 5 PELLENTESQUE. RHONCUS DOLOR PURUS NON ENIM PRAESENT. AMET NULLA FACILISI MORBI TEMPUS IACULIS URNA ID. EGESTAS CONGUE QUISQUE EGESTAS DIAM. NEQUE VITAE TEMPUS QUAM PELLENTESQUE.

504

BANNER AD

518

BANNER AD

IDENTIFYING CONTEXTUAL OBJECTS FROM WEB CONTENT

CROSS-REFERENCE TO RELATED APPLICATIONS

This application is a continuation of U.S. patent application Ser. No. 17/845,410, filed on Jun. 21, 2022, the disclosure of which is hereby incorporated by reference in its entirety.

BACKGROUND

A user browsing a network, such as the Internet, may consume web content, including articles, images, videos, or the like. Such web content may be consumed by the user in a content-consumption context in which passive user engagement is permitted. From this content consumption context, a user may be presented with an opportunity to navigate to a different network location, which may exist in a different browsing context, including a browsing context in which more active user engagement is possible, such as a shopping context, a weather context, or a news context. However, a user may be unlikely to choose to navigate from one browsing context to another unless the user has reason to believe that the destination browsing context is likely to be of interest to the user.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to identifying contextual objects relating to web content and providing the contextual objects with the web content. Web content may include text, image, video, or other elements alone or in combination. An example of web content may be an article presented in a web browser on a computing device connected to the Internet. Contextual objects may be delivered to a user alongside the web content, such as by providing the contextual objects in an object carousel adjacent to the web content in a web browsing application or the like. In response to receiving a selection or other form of interaction with a contextual object, a user may be navigated from the web content to a different browsing context relating to the selected contextual object.

A contextualization engine may identify contextual objects. Identifying contextual objects relating to the web content may include analyzing one or more web content elements and determining whether any of the web content elements relates to any contextual objects. In examples, web content elements include hyperlink elements, and identifying contextual objects may involve comparing the hyperlink elements to a database or other record of hyperlink elements associated with contextual objects. Contextual objects related to web content may include products or services that may be available for purchase over the Internet.

Identifying contextual objects relating to the web content may also include determining a dominant entity of web content. For instance, a dominant entity of web content may be a topic, category, keyword, idea, or other item to which the web content relates. In examples, a dominant entity is the single entity most prevalent or prominent in web content. For example, the dominant entity of an article could be the topic most discussed in the article, such as a city, a person, an organization, a product, or the like. Based on identifying a dominant entity, contextual objects may be identified relating to the dominant entity. Multiple dominant entities may be determined for web content, including entities at different levels of generality.

Contextual objects may be provided in response to receiving a request for the web content to which the objects are related, such as in response to receiving a request from a computing device to view a video or an article for which contextual objects have been identified. In some cases, profile data associated with a request for web content may be accessible, such as when the content is requested by computer or user profile for which prior browsing history is accessible. In such instances, personalized contextual objects may be determined from the contextual objects. Personalized contextual objects may include the contextual objects most likely to be of interest to the user (or the likely user) requesting the web content.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an overview of an example user interface for providing contextual objects with web content.

DETAILED DESCRIPTION

Figure 1:
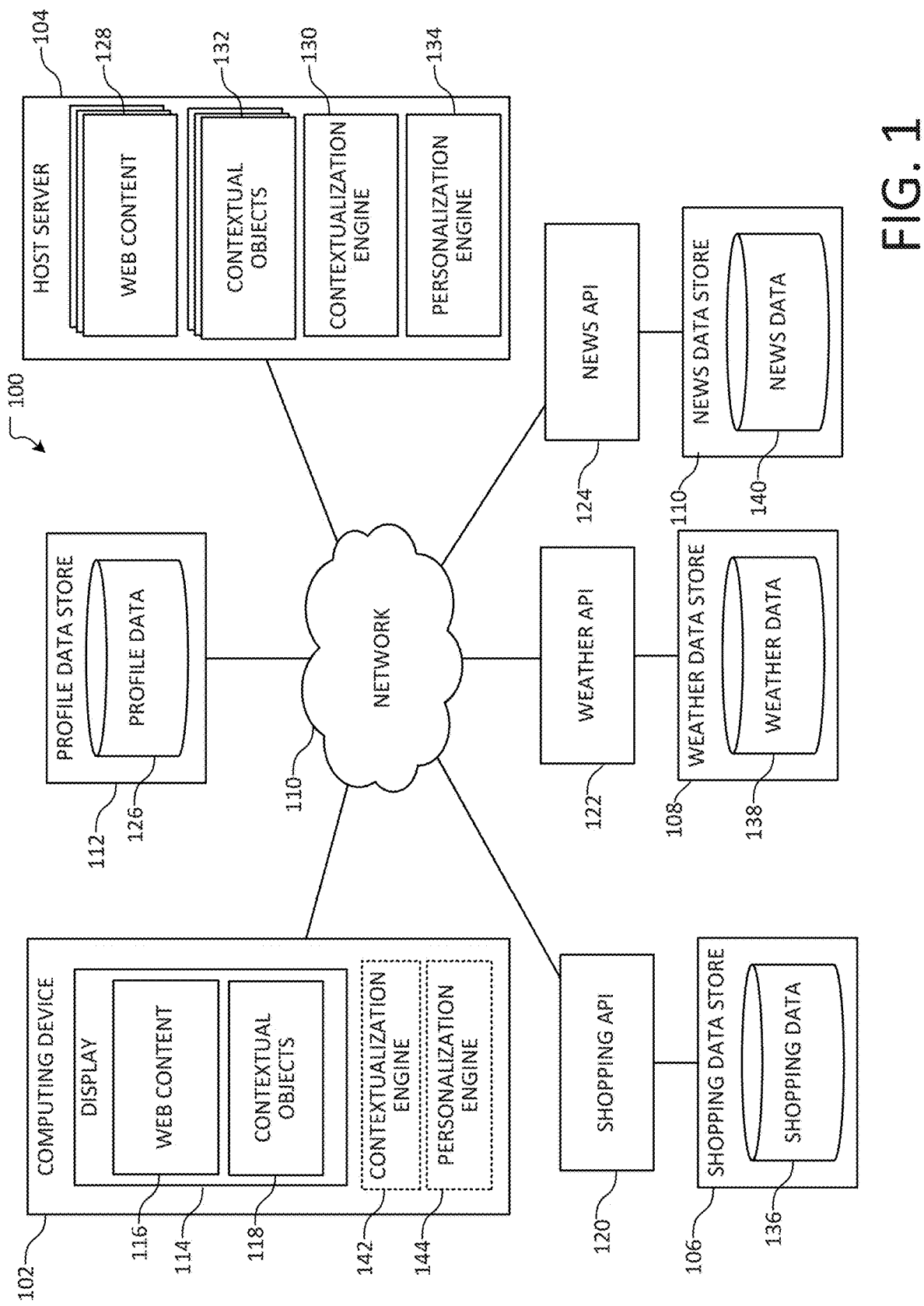
FIG. 1 illustrates an overview of an example system for determining contextual objects related to web content according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In an online browsing environment, different browsing contexts may exist, each with different characteristics and purposes. In some browsing contexts, a user may be able to consume digital content, such as by watching videos, reading articles, finding news stories, browsing social media, etc. These contexts may allow for primarily, or at least partially, passive user engagement, where the user may find and consume content but where the user has limited ability to interact with the content and/or with the browsing context in which it appears. In other contexts, there may be more opportunities for user interaction. For example, in a shopping context, a user may have not only the ability to browse digital content but may also have the ability to initiate a purchase of a service or product. In another example, in a weather context, a user may have the ability to provide input information to view a weather forecast for an area specific to that user, such as the user's current location or home location. In a news context, a user may have the ability to consume news information that may be tailored to that user's interests, location, etc. It will be appreciated that these are only examples and that there are many types of browsing contexts that may exist in an online browsing environment, with the characteristics and functionality of the contexts differing from context to context, allowing for a wide range of different types and/or amounts of user interaction In certain circumstances, a user may be provided with a way to navigate from one context to another. For example, a user may be provided with a way to navigate from a context meant for passive content consumption to a context with more opportunity for user interaction. However, in some cases, a user may be unlikely to navigate from one context to another if the user does not believe that the new context is likely to contain content or functionality of interest to the user.

Thus, in examples, it may be useful to demonstrate to the user that the new context is likely to contain content or functionality of interest. In examples, this may be accomplished by providing the user with one or more objects, such as by displaying visual objects on a user interface, that increase the user's interest in navigating to the new context. For example, objects may be included that are related to both the content currently being viewed by the user and also to the new browsing context to which the user is able to navigate. Such objects may be "contextual" objects. Furthermore, the objects provided may not only relate to the web content being provided to the user but, additionally, may relate to the user and/or the user's interests. Such objects may be "personalized" objects. In examples, these contextual and/or personalized objects may be displayed as a carousel of objects alongside web content being provided to the user. In such an example, the carousel of objects may be displayed within or alongside a user interface of the current browsing context and a user may navigate from the current context to a new context by selecting an element within the carousel.

In one nonlimiting and illustrative example, a user may be presented with an option to navigate from a content-consumption context to a more interactive context, such as a context in which the user may utilize shopping functionality to purchase goods or services (e.g., a "shopping context"). To indicate to the user that the new context is likely to be of interest, which, in turn, will increase the likelihood of the user navigating to the new context, the user may be provided with one or more contextual and/or personalized objects with the web content being consumed by the user in the current context. For example, if the user is reading an article in the current context (i.e., a content-consumption context), the user may be provided with an opportunity to navigate to a shopping context by providing the user with contextual objects that include a depiction and/or description of products that both relate to the article being read in the current context and to the goods that can be purchased in the new context. For instance, if the user is reading an article about the most comfortable running shoes and is being provided an opportunity to navigate to a shopping context in which the user will have an opportunity to purchase athletic apparel, the contextual objects may include images and/or description of running shoes that can be purchased in the shopping context should the user choose to navigate to that browsing context. Moreover, the contextual objects may be personalized, such as by including a depiction and/or description of products that relate to the user and/or to the user's preferences and interests, such as certain styles of shoes that the user has previously purchased or viewed.

Aspects of the present disclosure relate to identifying, determining, selecting, and/or presenting contextual and personalized objects to provide with web content. Identifying contextual and personalized objects may be accomplished in a number of ways. In examples, contextual objects can be identified by evaluating web content to identify objects that are related to the web content. For instance, contextual objects for a selection of web content may include objects that are mentioned, depicted, or otherwise referenced in that web content. In other examples, contextual objects for a selection of web content may include objects that relate to a theme or topic of the web content. In still other examples, contextual objects for a selection of web content may include objects that are not directly referenced in the web content but relate to an object that is referenced in the web content. Identifying contextual objects from web content may involve identifying elements of the web content and analyzing those elements to determine whether there are contextual objects related to that element. The elements of the web content could include text, such as a title or body of an article. The elements of the web content could include images, videos, or other visual elements of the content. The elements could include hyperlinks, buttons, or other elements of the web content that redirect to another piece of web content. By identifying, extracting, and/or analyzing these elements, it may be possible to identify objects related to the web content.

For example, returning to a previous nonlimiting example in which the user is reading an article, identifying contextual objects may involve using one or more elements of the article to identify contextual objects that are related to the content of the article. In examples, an element of an article that may be used to identify related objects to display may include a hyperlink within the article. In another example, an element of an article may be an image within the article or the title of the article. In still other examples, the content being consumed by the user may include audio/visual content. In such examples, an element of the content may be used to identify related objects, such as embedded tags within the audio/visual content or transcripts generated to reflect the substance of the audio/visual content.

In examples, contextual objects may be identified based on any one or more of the aforementioned elements of web content. The elements may be identified and extracted from the web content. The elements (or an aspect thereof) may then be used to determine whether there are any contextual objects related to those elements. For example, a hyperlink element may be used to identify contextual objects. In such an example, a URL of the hyperlink element may be extracted and used to identify any contextual objects associated with the hyperlink element. For instance, the URL may be compared against a database of URLs previously analyzed and associated with one or more contextual objects. Based on determining that the URL of the hyperlink element fully or partially matches a URL previously associated with a contextual object, this contextual object may be identified as being related to the web content in which the hyperlink element appears. As one nonlimiting example, in an article, a hyperlink element may include a URL redirecting to a web page of a retailer selling a product. Using the hyperlink element, a product ID may be extracted and compared against a database of product IDs compiled based on an analysis of one or more web pages of the retailer's web site. Based on identifying a match between the product ID of the hyperlink element and a product in the database, it may be determined that the hyperlink element indicates that the product in the database is a contextual object for the web content. In an article or any other web content containing more than one hyperlink element, this process may be repeated for each hyperlink element, and any contextual objects identified based on the analysis may be added to a list of contextual objects for the web content.

In examples, contextual objects may be identified based not on any one element of web content but based on an evaluation of a collection of elements of the web content. For example, the elements of web content may be used to perform dominant entity extraction based on the web content. As used herein, the dominant entity of a selection of web content refers to items, topics, themes, categories, or other aspect of a selection of web content that predominates the web content. For example, a dominant entity of an article may be the topic of the article. In another example, the dominant entity of a movie could be the lead actor in that movie. In yet another example, the dominant entity of web content could be a product or category of products that is central to the web content. In any event, the dominant entity is determined based on an analysis of a collection of elements of the web content and, based on that analysis, is determined to be a central aspect of the web content. Contextual objects for web content may be identified based on identifying a dominant entity for the web content, such as by querying a database, an API, or the like for products related to the dominant entity. For example, the dominant entity of an article may be identified as a certain product or product category. Based on identifying the product as the dominant entity, it may be possible to generate a list of contextual objects related to that product by accessing a database of products and identifying those products most closely related to the dominant entity.

It is possible for web content to have more than one dominant entity, and the identification of a dominant entity for web content may involve generating a confidence score reflecting the confidence that the identified dominant entity is the dominant entity for the web content. Some dominant entities may be more generic, while others are more specific. For instance, for an article discussing the best running shoes, the dominant entity for the article may be running shoes. However, another dominant entity for the article may be the product category of shoes or footwear more generally. At still a higher level of generality, the dominant entity of the article may be apparel. The confidence score for the web content may differ for the dominant entities identified at different levels of generality. For example, it may be possible to confidently determine that one dominant entity of the web content is apparel, but not possible to confidently determine which specific type of apparel is the dominant entity. In such instances, it may be desirable to use the most specific dominant entity that can be identified subject to certain confidence requirements. That is, if it isn't possible to confidently identify a more specific dominant entity at a lower level of generality, it may be better to use a more generic dominant entity at a higher level of generality. For example, it may be preferable to identify contextual objects relating to several different products in the category of athletic apparel (e.g., running shoes, workout shirts, running socks, etc.) for an article about running shoes than to identify contextual objects relating to a specific product that is not the main focus of the article (e.g., workout shirts only).

Contextual objects may be identified for web content when the web content is ingested into a web browsing system, such as when the web content is indexed by the web browsing system. For example, whenever new web content is identified and added to an index of a system, contextual objects for that web content may be identified based on one or more elements of the web content. Similarly, whenever existing web content is updated or changed and the updates/changes are added to the index, contextual objects for that web content may also be updated/changed to the extent the new web content has elements indicating a different set of contextual objects for the web content. For example, when an article discussing the best products within a certain product category is first added to an index, the contextual objects identified for that web content may include the products mentioned or referenced in the article. If the article is later updated by the author to include a different set of products, the contextual objects for the article may be similarly updated to reflect the changes to the web content.

In examples where contextual objects are identified for the web content upon indexing of the web content, the web content and any identified contextual objects may be stored together (or in association with one another), and both may be provided in response to receiving a request for the web content. For example, if the web content is an article and the contextual objects are products related to the article, when a request for the article is received, the article may be provided and the contextual objects may be provided alongside the article, such as in an object carousel adjacent to the requested content.

Additionally or alternatively, contextual objects may be identified for web content when the web content is requested by and/or delivered to a user. For instance, the elements of the web content may be identified, extracted, and/or analyzed to identify objects related to the web content when a request for the web content is received and when the web content is provided in response to that request. In such instances, contextual objects may be identified at the device of the user where the web content is being provided (e.g., displayed). In other examples, contextual objects may be identified at the server where the web content is being stored and/or where the user request for the web content is received. Whether identified by at a server providing the web content or a user device displaying the web content, any contextual objects identified for requested web content may be provided with the requested web content, such as in an object carousel adjacent to the requested content.

In examples where contextual objects are identified for web content when the web content is requested and/or delivered, the contextual objects identified for the web content may be stored in an index or other data store together with (or in association with) the web content such that when the web content is subsequently requested (e.g., by a different user), the contextual objects identified for the web content may be provided with the requested web content.

In other aspects, the objects identified and/or provided for web content may be personalized. In examples, personalized objects may be identified based on the contextual objects identified for web content. Identifying personalized visual objects may involve determining whether profile data is available for a given request for web content. If the profile data is available, the profile data may be accessed and used to identify personalized contextual objects. Such profile data may include any combination of browsing data, shopping data, demographic data, or the like. Such profile data may be associated with the user currently browsing or, in other examples, may be associated with a group of individuals having similar characteristics to that user. Identifying personalized visual objects may involve receiving a list of contextual visual objects and organizing those visual objects based on profile data. For instance, if a number of contextual objects are identified based on the content of a current context (e.g., an article being read by a user), those contextual visual objects may be ranked in an order of the objects most likely to be of interest to the user. Additionally or alternatively, the objects may be filtered to remove any objects unlikely to be of interest to the user based on profile data.

FIG. 1 illustrates an overview of an example system 100 for providing contextual objects with web content according to aspects described herein. As illustrated, system 100 includes computing device 102, host server 104, shopping data store 106, weather data store 108, news data store 110, and profile data store 112. As illustrated, these components of system 100 communicate via network 110, which may comprise a local area network, a wireless network, the Internet, or any combination thereof, among other examples.

While system 100 is illustrated in an example where computing device 102 may communicate with host server 104, shopping data store 106, weather data store 108, news data store 110, and profile data store 112 via network 110, it will be appreciated that, in other examples, these components may be directly connected to a computing device, for example using a wired (e.g., universal serial bus (USB) or other electrical connection) and/or wireless (e.g., Bluetooth Low Energy (BTLE) or Wi-Fi Direct) connection. Alternatively, the various elements depicted in FIG. 1 may reside on a single device. Computing device 102, host server 104, shopping data store 106, weather data store 108, news data store 110, and profile data store 112 via network 110 may each be any of a variety of devices, including, but not limited to, a mobile computing device, a tablet computing device, a laptop computing device, a desktop computing device, an IoT (or "smart") computing device, or a server computing device, among other examples.

Computing device 102 includes display 114. Display 114 may be configured to display a graphical user interface (GUI), such as by displaying on a digital screen of computing device 102. Display 114 may further include input means through which a user may interact with display 114 and/or with computing device 102. Such input means may include, for example, a touch screen or other means for receiving digital, gestural, touch, or any other user input.

On display 114, computing device 102 may display, among other things, web content 116 and contextual objects 118, as shown in the illustrative system 100. Web content 116 may include text, image, video, or any other content accessible through network 110. In examples, network 110 may be the Internet, such that web content 116 may include any content accessible on the Internet, such as documents, videos, web pages, or the like. For instance, web content 116 may be, or may include, an article stored on and accessible by a network, such as network 110. In another example, web content 116 may be a document or other network file located at a network address of an internet or intranet.

In examples, web content 116 comprises one or more web content elements (not depicted). A web content element may be a portion or element of a web page and may include text, video, image, or other types of content. A web content element may have visual attributes, including for example, the element's size, shape, location, orientation. Additionally, a web content element may, in examples, have functional attributes, such as a hyperlink element, which may direct a user to a web page, document, or other network location upon user selection of the hyperlink element. As an example, a web content element that is a hyperlink element may be associated with an embedded web address or URL, which upon activation, directs a user to a web page or location. In one example, the web address or URL may direct the user to a web site of a company selling a product or service through the Internet. In other examples, a hyperlink element may be associated with an address within an internal network of an organization (e.g., a location within the organization's intranet) and may, upon user selection, direct the user to a file located at that network address. In other examples, web content elements have functional attributes functionality allowing for user interaction, such as elements allowing for a user to enter or select information, such as on a page through which a user may enter text (e.g., on a fillable form) or select from a list of options (e.g., in a dropdown box).

Web content 116 may be associated with one or more browsing contexts (not depicted). As previously discussed, a browsing content relates to the context in which a user is accessing certain web content, and different browsing contexts may have different characteristics and functionality. An example browsing context is a content-consumption context, such as the context in which a user may access web content that is an article containing text, image, and/or video elements. Another example browsing context is a shopping context, in which a user may access web content that, through user interaction, allows the user to purchase goods or services. Yet another example browsing context is a weather context, in which a user may be able to access web content that relates to the weather in the user's current location and/or a location of interest to the user. Yet another example browsing context is a news context, in which a user may consume news relate to the user and/or to a topic or event of interest to the user. It will be appreciated that these example browsing contexts are merely illustrative and, furthermore, are not mutually exclusive, as certain browsing contexts may contain multiple types of content (e.g., a browsing context in which a user is able to both consume news content and purchase goods or services).

As depicted, display 114 further includes contextual objects 118. In examples, contextual objects 118 are objects that are not themselves a part of web content 116 but are in some manner connected or related to web content 116. Contextual objects 118 may be determined by analyzing web content 116 according to the systems and methods described herein. For example, contextual objects 118 may be determined by extracting, evaluating, and/or otherwise analyzing one or more web content elements of web content 116. For instance, contextual objects 118 may be determined by extracting one or more hyperlink elements of web content 116 and identifying one or more contextual objects 118 associated with the one or more hyperlink elements. An example of a hyperlink element with which a contextual object may be associated is a hyperlink element directing to a web page associated with a product, such as a web page through which a user may purchase the product. In such an example, the contextual object associated with the hyperlink element may contain information associated with or otherwise related to the product. For instance, the contextual object may include an image of the product, a price at which the product can be purchased, a description of the product, or the like.

Additionally or alternatively, contextual objects 118 may be determined by extracting a dominant entity of web content 116 and identifying one or more contextual objects 118 associated with the dominant entity. An example of a dominant entity of web content 116 with which a contextual object may be associated is a product category. For example, web content 116 may be evaluated and it may be determined that the dominant entity of web content 116 is a product category. Such a determination may be made based on a determination that web content 116 contains text, video, images, or the like describing, discussing, or otherwise relating to the product category.

One example of such web content may be a web article discussing several products sharing a product category, such as an article identifying the best or worst kitchen appliances. In such an instance, a determination may be made that the dominant entity of the web content is kitchen appliances and one or more contextual objects 118 may be identified that are associated with the dominant entity. Contextual objects 118 associated with kitchen appliances may include, for example, the names of kitchen appliances, images of kitchen appliances, the prices at which the kitchen appliances can be purchased, a description of the kitchen appliances, or the like. In another example, web content may be a web article discussing the best restaurants in a city. In such an instance, it may be determined that the dominant entity of the web content is the city and contextual objects 118 may be identified relating to the city. In this case, contextual objects 118 may include objects relating to the weather of the city, such as current weather and weather forecasts for the city. Contextual objects 118 may further include objects relating to news relating to that city, such as news articles written about the city or a list of upcoming events in the city.

As depicted in system 100, contextual objects 118 may be displayed alongside web content 116. In examples, contextual objects 118 are displayed alongside web content 116 in an object carousel (as discussed in more detail below). Contextual objects 118 may include images and/or text, and the images/text of contextual objects 118 may be arranged in the object carousel by preparing and/or displaying a tile or other distinct visual element for each of the contextual objects 118. In an example where contextual objects 118 are associated with products, the object carousel may contain a number of tiles, each containing an image of a product, a price at which the product can be purchased, and/or a description of the product. The images and/or text associated with each of the contextual objects 118 may be retrieved by computing device 102 from any one or more data stores, such as shopping data store 106, weather data store 108, news data store 110, or any other data store containing information relating to an identified contextual object. In examples, the images and/or text may be retrieved using one or more APIs associated with the one or more data stores from which the information is being retrieved, such as shopping API 120, weather API 122, news API 124, or the like.

In examples, contextual objects 118 may be personalized contextual objects. Computing device 102 may be used by a user to request that web content 116 be displayed on display 114. In such an instance, the request made/received by computing device 102 may be associated with a profile. The profile may be associated with computing device 102 and/or may be associated with one or more user profiles of computing device 102. When a request for web content 116 is made/received by computing device 102, a request may be made to profile data store 112 for any profile data 126 associated with the request (e.g., associated with the computing device and/or the user profile through which the request was made).

If profile data 126 associated with the request is available, it may be used to personalize the contextual objects 118 displayed on display 114 according to the systems and methods described herein. For example, if contextual objects 118 relating to web content 116 have been identified, profile data 126 may be used to determine which of the contextual objects 118 is most likely to be of interest to a user viewing the web content 116. In an example, contextual objects 118 may be products mentioned in and/or relating to an article. Profile data 126 may be used to determine, from the identified products, which of the products is most likely to be of interest to the user viewing the article based on profile data 126 showing the types of products that the user has previously viewed and/or purchased. In another example, contextual objects 118 may show the current and/or forecast weather for one or more cities mentioned in or related to an article. In this example, profile data 126 may be used to determine, from the identified weather objects, which of the objects is most likely to be of interest to the user viewing the article based on profile data 126 showing where the user has previously visited and/or lived.

As illustrated, system 100 further includes host server 104. Host server 104 is depicted as a single host server, but it will be appreciated that host server 104 may include several servers distributed throughout multiple physical or virtual locations. Host server 104 may be a server of a company or program indexing and/or delivering content over a network, such as the Internet. In examples, host server 104 stores web contents 128. Web contents 128 may, like web content 116, include text, image, video, or the like. Web contents 128 may also, like web content 116, include one or more web content elements. In examples, host server 104 may crawl web pages and/or web sites accessible via the Internet and may index web content found in the process.

Web contents 128 may include content indexed by host server 104 in response to crawling web sites accessible via the Internet. Web contents 128 may include the same content as web content 116 displayed on display 114 of computing device 102. Indeed, computing device 102 may be used to request web content 116 from host server 104, which stores copies of web contents 128 and delivers the requested web contents 128 in response to requests from computing devices, such as computing device 102, received via network 110. For example, host server 104 may be associated with a search engine or information repository accessible by computing device 102 and through which computing device 102 may request web content 116. In such examples, web contents 128 and web content 116 may include articles, videos, documents, web pages, database elements, or the like.

In examples, host server 104 includes contextualization engine 130. Contextualization engine 130 may analyze web contents 128 to identify one or more contextual objects 132 related to web contents 128 according to aspects of the present disclosure. In examples, contextual objects 132 related to web contents 128 are identified by contextualization engine 130 when host server 104 crawls web locations and stores web contents 128. In other examples, contextualization engine 130 identifies contextual objects 132 related to web contents 128 if and when web contents 128 are requested by a computing device, such as identifying contextual objects 118 in response to receiving a request for web content 116 from computing device 102. Regardless of when contextualization engine 130 identifies contextual objects 132, contextual objects 132 may be stored by host server 104 upon their identification.

In examples, contextual objects 132 are stored by host server 104 with or in connection with web contents 128. For example, web contents 128 and contextual objects 132 may be stored such that the association between web contents 128 and contextual objects 132 may be readily identified. As previously discussed, contextual objects 132 may include text and/or images, which may be retrieved from one or more data stores using one or more APIs, such as from data stores 106-112 using APIs 120-124. In such examples, host server 104 may store the text and/or images of contextual objects 132. Alternatively, host server 104 may store only information sufficient to allow host server to retrieve the text and/or images using APIs 120-124 upon request for web contents 128 from a computing device, such as a request for web content 116 from computing device 102. For example, contextual objects 132 may be products associated with web contents 128. In such an instance, contextual objects stored by host server 104 may include product names or identifiers that can be used by host server 104 to retrieve, from shopping data store 106, text/images relating to the products, including product images, product prices, product descriptions to provide with web contents 128 in response to a request for web contents 128.

In examples, host server 104 includes personalization engine 134. Personalization engine 134 may be used to personalize any contextual objects 132 identified by contextualization engine 130 according to aspects of the present disclosure. For example, contextualization engine 130 may identify contextual objects 132 associated with web contents 128. These contextual objects 132 may be related to the web contents 128 based on analysis performed by the contextualization engine 130 of the web contents 128, including without limitation an analysis of any hyperlink elements in web contents 128 or any dominant entity identified for web contents 128. While these contextual objects 132 may be related to web contents 128, the contextual objects 118 may not be personalized for any specific user or device to whom the contextual objects 132 and web contents 128 are being presented. Thus, personalization engine 134 may, based on profile data 126 requested from profile data store 112, personalize the contextual objects 132 in response to receiving a request from a computing device for the web contents 128 with which contextual objects 132 are associated. Personalizing the contextual objects 132 may include, for example, identifying a profile associated with the computing device requesting web contents 128, retrieving profile data 126 associated with the profile, determining one or more of the contextual objects 132 most likely to be of interest to the user based on the profile data, and providing the personalized contextual objects 132 with the requested web contents 128.

While contextualization engine 130 and personalization engine 134 are depicted in FIG. 1 as part of host server 104, they are also depicted as optional components 142 and 144 of computing device 102. In examples, the operations performed by contextualization engine 130 and personalization engine 134 are performed by processors that are part of or otherwise associated with host server 104. In other examples, though, the operations are performed by processors that are part of or are otherwise associated with computing device 102. In still other examples, the operations are distributed across both devices such that certain operations are performed by processors that are part of or otherwise associated with host server 104 while others are performed by processors that are part of or are otherwise associated with computing device 102. The distribution of operations between host server 104 and computing device 102 may vary depending on the circumstances in which contextualization engine 130 and personalization engine 134 are operating.

For example, for some web content, it may not be possible for the analysis performed by contextualization engine 130 to take place until after certain web content elements have been rendered at the computing device 102. In such an instance, contextualization engine 142 at computing device 102 may extract the web content elements once rendered at the computing device 102 and may transmit information relating to the extracted web content elements back to host server 104 for determination of any contextual objects associated with the web content elements. For example, computing device 102 may extract hyperlink elements from web content rendered at computing device 102 and send information regarding the extracted hyperlink elements, such as a web address or URL of the hyperlink element, to host server 104 via network 110. Thereafter, host server 104 may determine whether there are any contextual objects associated with the extracted hyperlink element, for example by comparing the information received regarding the hyperlink element to data (e.g., data 136-140) in a data store (e.g., data stores 106-112). For instance, host server 104 may receive from computing device 102 the URLs associated with one or more hyperlink elements extracted from web content 116. Contextualization engine 130 of host server 104 may compare these URLs to the URLs of previously analyzed/indexed web content and, based on identifying a match or a similarity, identify on object ID associated with the received URL. Contextualization engine 130 may then look up information (e.g., text or images) associated with the object ID in a data store (e.g., data stores 106-112) and transmit, via network 110, the object ID and/or its associated information to computing device 102 for display as contextual objects 118. Alternatively, contextualization engine 144 may determine contextual objects 118 based on analyzing web content 116 at computing device 102 by performing the same or similar operations as described in connection with contextualization engine 130.

Likewise, personalization engine 144 at computing device 102 may perform aspects of the personalization operations described herein. For instance, if profile data associated with a user is accessible only by the computing device 102 (e.g., because it is stored at computing device 102 or because a user has restricted access to such data by remote devices), personalization of the contextual objects may occur at computing device 102 using profile data accessed by personalization engine 144.

Figure 2:
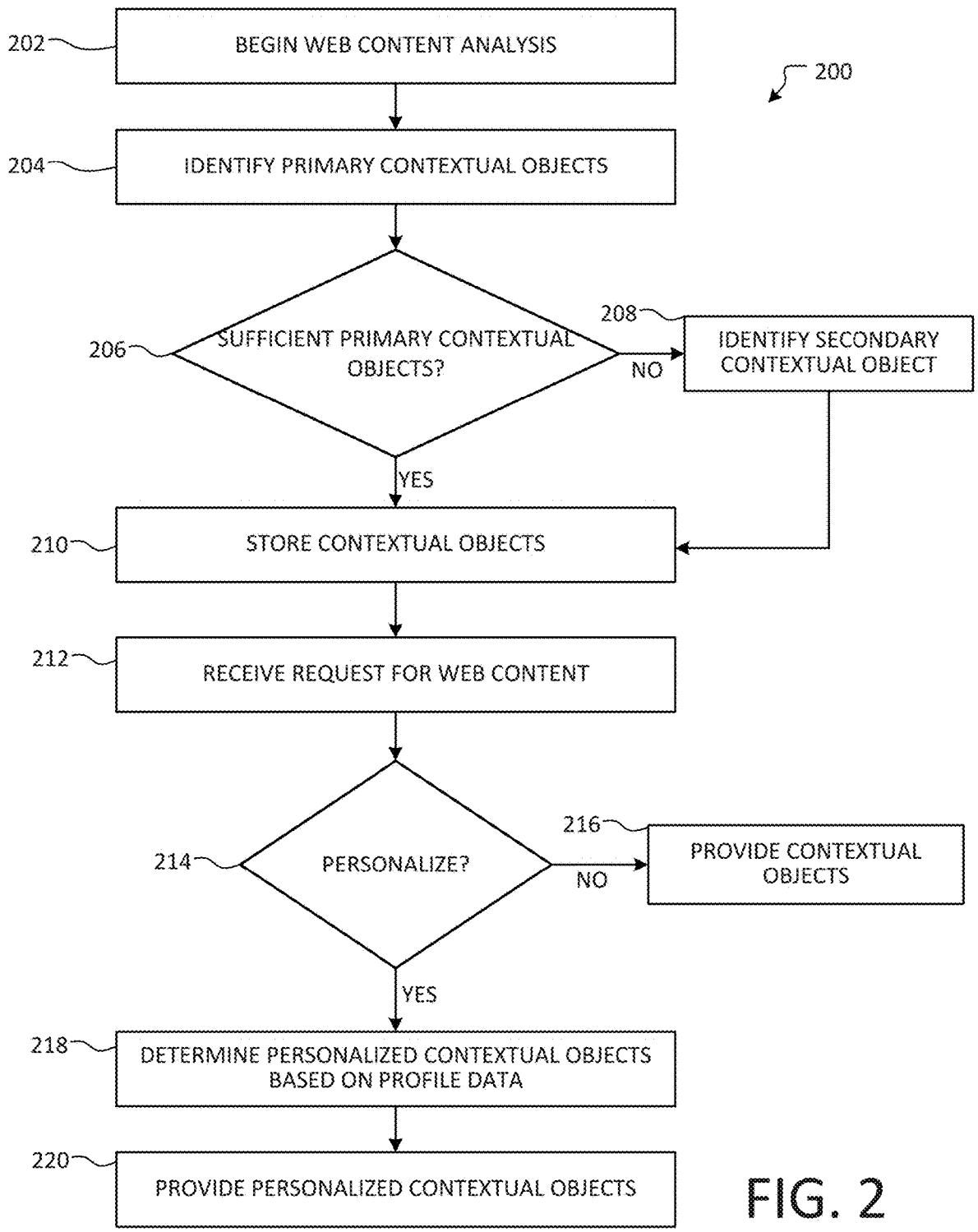
FIG. 2 illustrates an overview of an example method for determining contextual objects related to web content.

FIG. 2 illustrates an exemplary method 200 for providing personalized contextual objects based on web content analysis. In examples, aspects of method 200 are performed by a device and/or by processing components associated therewith, such as contextualization engine 130, personalization engine 134, contextualization engine 142, and/or personalization engine 144, discussed above with respect to FIG. 1.

Method 200 begins at operation 202, where web content analysis begins. Web content analysis refers to the techniques described or otherwise contemplated herein relating to analyzing web content to determine contextual and/or personalized objects relating to web content. It will be appreciated that web content analysis may occur at various points in time and/or in response to various triggering events. For example, web content analysis may be performed when web content is indexed by a host server. That is, when a host server first retrieves web content and stores the content (or aspects thereof) in an index, web content analysis may be performed. In such an instance, the results of the web content analysis (i.e., the determination of any related contextual objects) may be stored with or in association with the web content in the index, such that the contextual objects may be identified at a later point in time when the web content is requested by and/or delivered to a computing device.

In other examples, web content analysis may occur when web content is requested by and/or delivered to a computing device. For instance, the web content may be stored in an index or otherwise accessible via a network. However, web content analysis for the web content may not occur until the web content is delivered to a computing device in response to a request for the web content. In some cases, it may not be possible to perform web content analysis until the web content is delivered. In other cases, though, web content analysis may not be performed until the web content is requested even though it may be possible to perform web content analysis prior to that point.

For example, it may be advantageous to identify contextual objects when the web content is requested as opposed to (or in addition to) identifying contextual objects when the web content is indexed if certain web content may be highly dynamic and may frequently change. For example, while an article about the best running shoes may change relatively infrequently, web content about the best teams or players in a sports league or about the latest legislation coming out of a government body may change relatively frequently as the real-world circumstances surrounding those topics change. Thus, for frequently changing web content, it is preferable to identify contextual objects closer in time to when the web content is requested to ensure that the contextual objects are as up-to-date as possible when provided for presentation alongside the web content.

Another potential advantage of identifying contextual objects when the web content is requested relates to limitations in the type of analysis of elements that is available upon indexing. For instance, the amount or type of analysis available for certain web content elements may be limited at the time of indexing. As an example, for a hyperlink within an article, the hyperlink may be useful for identifying related contextual objects if the link directs to a domain with which the system is relatively familiar, such as the web site of a large retailer or some other site that has been previously visited and/or indexed. In such an instance, the hyperlink may be used to identify a contextual object if the system is familiar with the web site of the larger retailer and is able to use, for example, a product code in the hyperlink URL to identify an object associated with the hyperlink element. In other instances, though, the hyperlink may direct to a domain with which the system is unfamiliar, such as a small or new retailer, and the URL of the hyperlink may not be useful for identifying contextual objects. In such an instance, it may not be possible to use the hyperlink element to identify contextual objects until the web content is requested and the hyperlink element is accessed, providing more information about the hyperlink element from which it may be possible to more accurately identify one or more contextual objects related to the hyperlink element.

After beginning the web content analysis, method 200 proceeds to operation 204, where primary contextual objects are identified. As discussed, a contextual object is an object relating in some manner to the web content being analyzed. A primary contextual object is an object with a direct relationship to the web content, such as an object that appears in the web content or an object that is identified based on the dominant entity of the web content. For example, for web content that is an article discussing several service providers in a geographic area, such as hair salons, the primary contextual objects for that web content would include the hair salons mentioned in the article and/or any hair salons identified based on the dominant entity of the article, which could include hair salons and the geographic region in question. Put differently, primary contextual objects are contextual objects identified based on a direct analysis of the web content itself. This contrasts with secondary contextual objects which, as discussed further below, are contextual objects identified based on the primary contextual objects—that is, based indirectly on the analysis of the web content.

At operation 204, primary contextual objects are identified. It will be appreciated that the present disclosure describes and contemplates a number of techniques for identifying primary contextual objects, including analysis of hyperlink elements in web content, identification of a dominant entity of web content, and more. More specific illustrative techniques are discussed in greater detail elsewhere herein, including in connection with FIGS. 3 and 4.

At determination 206, it is determined whether sufficient primary contextual objects have been identified. In examples, there is a threshold of contextual objects that need to be identified before the contextual objects can be provided with web content. For instance, the threshold may be based on the number of contextual objects needed to fill an object carousel. In another example, the threshold may be based on the number of contextual objects needed to provide a satisfactory user experience to make it likely that a user will select or otherwise interact with one of the contextual objects. In another example, determination 206 may be based on a cumulative degree of relatedness between the identified contextual objects and the analyzed web content. That is, if the identified contextual objects are, taken together, insufficiently related to the web content being analyzed, it may be determined that the primary contextual objects are not sufficient in some respect.

If determination 206 is "NO," method 200 proceeds to operation 208, where secondary contextual objects are identified. If the primary contextual objects are not sufficient, such as because the quantity or quality of primary contextual objects falls below a threshold, secondary contextual objects may be identified. In examples, secondary contextual objects are contextual objects that are related to the primary contextual objects identified at operation 204. For example, primary contextual objects may be products that are directly related to an article, such as because the products are named or mentioned in the article. In this example, identifying secondary contextual objects for the article may involve looking up products that are related to those products directly related to the article. Looking up such secondary contextual objects may involve consulting a database or program storing or capable of determining relationships between contextual objects. For example, a request may be made to a shopping API associated with a shopping data store of shopping data for a list of products related to an identified product. In response to receiving a name or other identified or a product, the shopping API may be able to provide a list of products related to that product. These related products may be used to identify secondary contextual objects that are indirectly related to web content by nature of being related to products that appear directly in the web content.

From operation 208 or if the determination 206 is "YES" (i.e., there are sufficient primary contextual objects), method 200 proceeds to operation 210, where contextual objects (including primary contextual objects and any secondary contextual objects) are stored. In examples, storing a contextual object may include storing images and/or text related to the contextual object, such as an image of a product for a contextual object that is a product or a weather report for a city that is a contextual object. In other examples, storing a contextual object may include storing information sufficient to retrieve text and/or images associated with the contextual object, such as by using an API to request the text/images from a data store of information associated with a type of contextual object. For example, if the contextual object is a product or service, storing contextual object at operation 310 may include storing a product/service identifier that can be used to retrieve text/images relating to the product or service by a request to a shopping API associated with a data store of shopping data. Or, if the contextual object is weather data for a city, storing the contextual object at operation 310 may involve storing an identification of the city and the type of data that is contextual for the web content, such that a weather forecast may be accessible by a request to a weather API associated with a data store of weather data.

At operation 212, a request for web content is received. Receiving a request for web content may involve receiving a request from a computing device via a network. A request for web content may identify the content being requested and an address of the requesting device indicating the source of the request and where the content should be delivered. In examples, a request for web content is received based on a user's selection of the web content in a web browser, such as by a user entering a URL of the web content, selecting a hyperlink directing to the web content, or the like. A request for web content may be accompanied by information identifying the computing device making the request and may further include information identifying a user responsible for generating the request, such as a user ID, user name, user IP address, or the like.

At determination 214, it is determined whether to personalize the contextual objects. Personalizing the contextual objects may involve identifying, from the contextual objects identified at operations 204 and 208, the contextual objects most likely to be of interest to the device or user from whom a request for web content was received at operation 212. In some cases, personalization may not be possible or desirable. For instance, personalization may not be possible when the request for web content is not accompanied by any information from which it may be possible to determine the identity of the device or user requesting the web content. Or, in another example, it may be possible to determine the source of the request, but it may not be possible to access any profile data associated with the source of the request, which may be necessary to perform personalization. Additionally or alternatively, it may not be desirable to personalize the contextual objects, such as if a user has indicated a preference that their user profile data not be used or if the source of the web content request is a computing device known to be associated with multiple users with widely varying preferences. Conversely, it may be advantageous to perform personalization if the source of the content request is known and profile data associated with the source of the request is plentiful and is readily accessible Accordingly, determination 214 may be based on any one or more of these factors.

If determination 214 is "NO," method 200 proceeds to operation 216, where the contextual objects are provided. Providing a contextual object may include presenting the contextual object or causing the contextual object to be presented on a display of a computing device. In examples, a contextual object identified as being related to web content may be provided (e.g., presented) with the web content to which it is related. For example, if a user requests web content to be displayed or otherwise delivered to a computing device (e.g., by requesting to read an article on a laptop or mobile phone), one or more contextual objects determined to be related to the web content may be provided with the web content when it is delivered to the computing device. For instance, the contextual object may be displayed alongside the web content (e.g., adjacent to an article requested by the computing device).

It will be appreciated that the format in which the contextual objects are displayed may vary depending on the format of the computing device to which the contextual objects are being provided. The determination of how/where to display the contextual objects may be made by the computing device requesting the web content. In other examples, providing contextual objects may involve providing information relating to how the objects can or should be displayed. For instance, providing contextual objects may involve providing ranking information that may be used to determine the order in which the contextual objects should be displayed. Such ranking information may be related to, for instance, the degree of relationship between the contextual objects and the requested web content. For example, contextual objects with a lower degree of relationship to the web content may be lower ranked and displayed with lower prominence than other contextual objects having a higher degree of relationship to the web content.

Providing contextual objects at operation 216 may involve providing text/images associated with the contextual objects. For example, for contextual objects that are products/services, providing contextual objects may involve transmitting text/images relating to the products/services, such as pricing information, product description information, and the like. In other examples, providing contextual objects at operation 216 may involve providing information sufficient to retrieve text/images relating to the contextual objects, such as web addresses at which text/visual items may be retrieved, via a network, for presentation on a computing device.

In examples, contextual objects provided with web content may allow a user to navigate from the current web content to different web content, including web content in a different browsing context from the browsing context of the current web content. For example, a computing device may be displaying an article, a video, a social media feed, or the like in a passive content consumption context. Contextual objects may be determined for the web content being displayed, and the contextual objects may be provided alongside the web content, such as in an object carousel. In response to receiving a selection of one of the contextual objects, a different web browsing context may be provided to the user, the new web browsing context relating in some way to the selected contextual object. For example, contextual objects relating to products discussed in an article may be provided alongside the article. In response to receiving a selection of one of the products, navigation may proceed to a shopping context in which the selected product is available for purchase.

If determination 214 is "YES," method 200 proceeds to operation 218, where personalized contextual objects are determined based on profile data. Determining personalized contextual objects may involve determining, from the request for web content received at operation 212, the source of the request, such as information about the computing device and/or user making the request. Based on determining the source of the request, profile data associated with the source of the request may be accessed. Profile data may include, among other things, location of the source, demographic data, browsing history data, purchase history data, address history data, and the like. Determining personalized contextual objects at 218 may involve using the profile data to determine which of the one or more contextual objects are most likely to be of interest to the user making the request for the web content and/or are most likely to cause the user to select a contextual object and navigate to a new browsing context associated with the contextual object. In examples, the identified contextual objects may be filtered, ranked, arranged, or otherwise modified to personalize the contextual objects and, in doing so, maximize the likelihood of user engagement. For example, for contextual objects that are products mentioned or related to an article discussing athletic apparel, profile data may be used to personalize the contextual objects by identifying the objects that are most/least likely to be of interest to the user based on the user's prior browsing or shopping history. In examples, objects may be filtered based on the user's age, location, gender, etc. It will be appreciated that determining personalized contextual objects based on profile data may involve utilizing machine learning programs or algorithms trained to identify objects most likely to be of interest based on profile data.

At operation 220, personalized contextual objects are provided. Providing contextual objects may involve many of the same aspects as providing contextual objects at operation 216, such as how, when, and where contextual objects may be provided. Whereas in operation 216, the contextual objects provided were not personalized, the personalized contextual objects provided at operation 220 have been personalized to at least some extent. Thus, for the same web content, the personalized contextual objects provided at operation 220 may differ from those provided at operation 216 depending on the source of the request for web content. Moreover, for similar reasons, the personalized contextual objects provided at operation 220 may vary from one request to the next.

Figure 3:
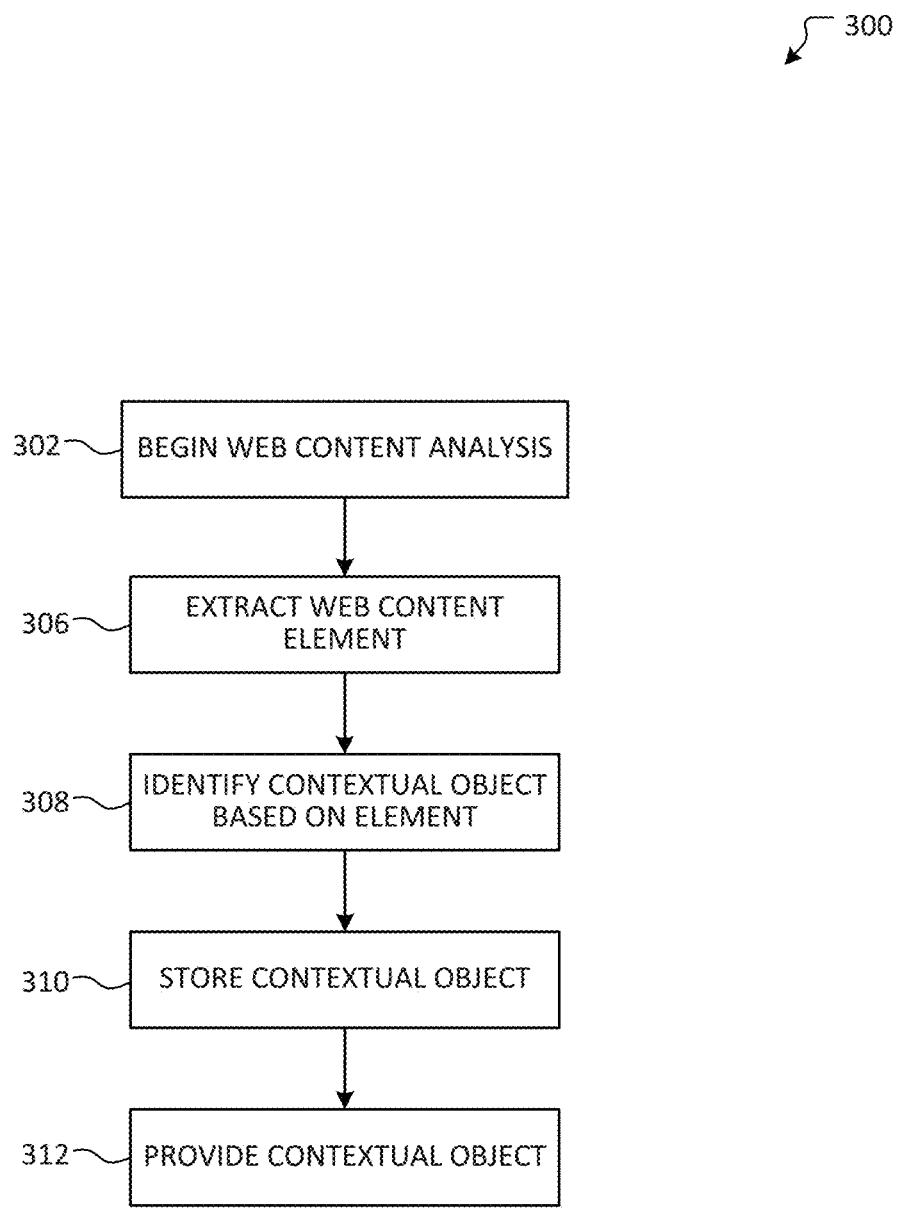
FIG. 3 illustrates an overview of an example method for performing web content analysis to determine contextual objects.

FIG. 3 illustrates an exemplary method 300 for providing personalized contextual objects based on web content analysis. In examples, aspects of method 300 are performed by a device and/or by processing components associated therewith, such as contextualization engine 130, personalization engine 134, contextualization engine 142, and/or personalization engine 144, discussed above with respect to FIG. 1.

Method 300 begins at operation 302, where web content analysis begins. As discussed, web content analysis may begin at various points in time and/or in response to various triggering events, including without limitation when web content is indexed by a host server or when web content is requested by a computing device.

At operation 306, a web content element is extracted. Extracting a web content element may involve determining one or more properties or attributes associated with the web content element. For example, a web content element may be a hyperlink element and extracting the web content element may involve determining a URL or web address associated with the hyperlink element. In another example a web content element may be an image, and extracting the web content element may involve identifying one or more image properties, such as by isolating the image from the surrounding web content, determining the pixel intensities of the image, performing machine learning image recognition on the image, and the like. It will be appreciated that for each of the many different types of web content elements that may be included in web content, there are a number of different properties or attributes that may be extracted at operation 306. Furthermore, although operation 306 is described in illustrative method 300 as involving the extraction of a single web content element, it will be appreciated that more than one web content element may be extracted and more than one property or attribute may be identified for a given web content element.

At operation 308, a contextual object is identified based on the extracted web content element. In examples, a contextual object is identified by comparing the extracted web content element is compared to a store of web content elements associated with previously analyzed web content. For example, web content from several different web domains and/or web addresses may have been previously analyzed, such as by parsing the web content and extracting one or more web content elements therefrom. These extracted web content elements or information relating thereto may be stored as data, such as by storing properties or attributes of the web content elements in a database in association with the network address(es) at which the web content was accessed. For instance, web content associated with a retailer's web site may have been previously analyzed and web content elements extracted.

For example, for the different web pages of the retailers' web sites on which different products or services are being offered for sale, web content elements such as the name of the product/service, the price of the product/service, a description of the product/service, an image of the product/service, or the like. The extracted web content elements may be stored in association with the web addresses of the web pages where the web content was accessed (e.g., the URL of the retailer's web site).

In examples, at operation 308, contextual objects may be identified by comparing one or more web elements extracted from the web content to the web content elements previously extracted, analyzed, and/or stored in connection with the previously analyzed web content. A contextual object may be identified based on determining that a web content element of the web content currently being analyzed is the same as or similar to a web content element of web content previously analyzed.

In an illustrative, non-limiting example, operation 306 may involve extracting a hyperlink element. In this example, extracting the hyperlink element may involve determining an address or URL associated with the hyperlink element, such as the address to which the hyperlink element redirects in response to selection of the hyperlink element. At operation 308, a contextual object may be identified based on the extracted hyperlink element by determining that the address associated with the hyperlink element is the same as or similar to the address of previously analyzed web content. In the example where the web content from an online retailer may have been previously analyzed, the addresses at which various products/services are being sold may have been extracted and stored. Thus, at operation 308, if a hyperlink element of web content is compared to the addresses of previously analyzed web content, it may be determined that hyperlink element directs to a web page at which a product/service is available for purchase. Based on this determination, the product/service available at that web page may be identified as a contextual object for the web content under analysis. For example, in analyzing a web content that is an article containing hyperlink elements, the hyperlink elements may direct to pages at which various products/services are available for purchase, and these products/services may be identified as contextual objects for the web content under analysis.

At operation 310, an identified contextual object is stored. In examples, a contextual object is stored with or in association with the web content to it is related, such as in a relational database or in an index of web content. In examples, storing a contextual object may include storing images and/or text related to the contextual object, such as an image of a product for a contextual object that is a product or a weather report for a city that is a contextual object. In other examples, storing a contextual object may include storing information sufficient to retrieve text and/or images associated with the contextual object, such as by using an API to request the text/images from a data store of information associated with a type of contextual object. For example, if the contextual object is a product or service, storing contextual object at operation 310 may include storing a product/service identifier that can be used to retrieve text/images relating to the product or service by a request to a shopping API associated with a data store of shopping data. Or, if the contextual object is weather data for a city, storing the contextual object at operation 310 may involve storing an identification of the city and the type of data that is contextual for the web content, such that a weather forecast may be accessible by a request to a weather API associated with a data store of weather data.

At operation 312, a contextual object is provided. Providing a contextual object may include presenting the contextual object or causing the contextual object to be presented on a display of a computing device. In examples, a contextual object identified as being related to web content may be provided (e.g., presented) with the web content to which it is related. For example, if a user requests web content to be displayed or otherwise delivered to a computing device (e.g., by requesting to read an article on a laptop or mobile phone), one or more contextual objects determined to be related to the web content may be provided with the web content when it is delivered to the computing device. For instance, the contextual object may be displayed alongside the web content (e.g., adjacent to an article requested by the computing device).

It will be appreciated that the format in which the contextual objects are displayed may vary depending on the format of the computing device to which the contextual objects are being provided. The determination of how/where to display the contextual objects may be made by the computing device requesting the web content. In other examples, providing contextual objects may involve providing information relating to how the objects can or should be displayed. For instance, providing contextual objects may involve providing ranking information that may be used to determine the order in which the contextual objects should be displayed. Such ranking information may be related to, for instance, the degree of relationship between the contextual objects and the requested web content. For example, contextual objects with a lower degree of relationship to the web content may be lower ranked and displayed with lower prominence than other contextual objects having a higher degree of relationship to the web content.

Providing contextual objects at operation 312 may involve providing text/images associated with the contextual objects. For example, for contextual objects that are products/services, providing contextual objects may involve transmitting text/images relating to the products/services, such as pricing information, product description information, and the like. In other examples, providing contextual objects at operation 312 may involve providing information sufficient to retrieve text/images relating to the contextual objects, such as web addresses at which text/visual items may be retrieved, via a network, for presentation on a computing device.

In examples, contextual objects provided with web content may allow a user to navigate from the current web content to different web content, including web content in a different browsing context from the browsing context of the current web content. For example, a computing device may be displaying an article, a video, a social media feed, or the like in a passive content consumption context. Contextual objects may be determined for the web content being displayed, and the contextual objects may be provided alongside the web content, such as in an object carousel. In response to receiving a selection of one of the contextual objects, a different web browsing context may be provided to the user, the new web browsing context relating in some way to the selected contextual object. For example, contextual objects relating to products discussed in an article may be provided alongside the article. In response to receiving a selection of one of the products, navigation may proceed to a shopping context in which the selected product is available for purchase.

Figure 4:
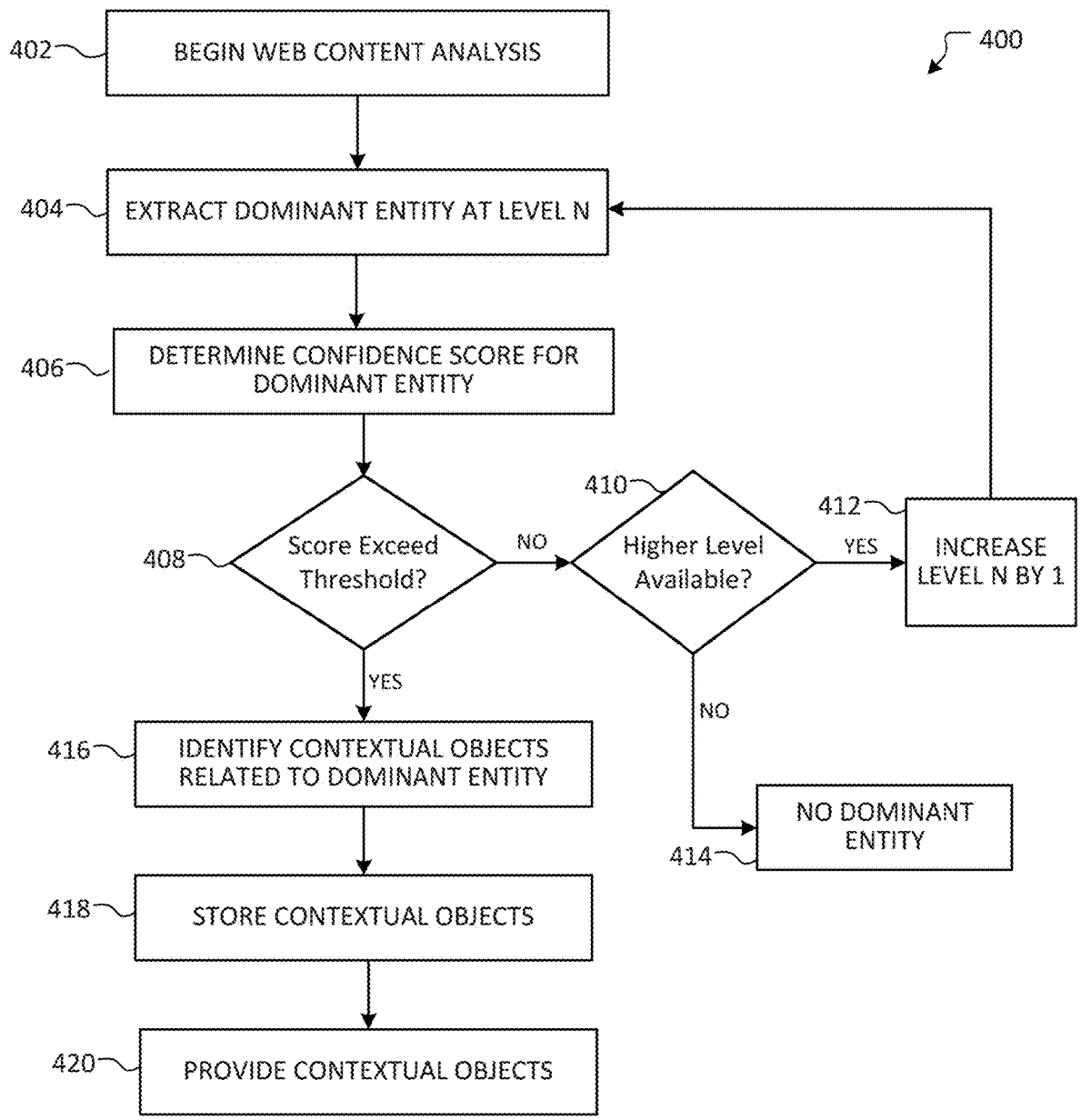
FIG. 4 illustrates an overview of an example method for performing web content analysis to determine contextual objects.

FIG. 4 illustrates an exemplary method 400 for providing personalized contextual objects based on web content analysis. In examples, aspects of method 400 are performed by a device and/or by processing components associated therewith, such as contextualization engine 130, personalization engine 134, contextualization engine 142, and/or personalization engine 144, discussed above with respect to FIG. 1.

At operation 402, web content analysis begins. As discussed previously, web content analysis may occur at different points or times depending on the circumstances, including when web content is indexed at a host server, when web content is requested, when web content is delivered, etc.

At operation 404, a dominant entity is extracted. Extracting a dominant entity from web content may involve analyzing the web content to determine an item, topic, theme, etc. that is dominant in the content. These items, topics, themes, etc. may be referred to as entities, and entities may be characterized at different levels of generality. Thus, at operation 404 depicted in method 400, a dominant entity for the web content is extracted at "level N," indicating that the dominant entity is extracted at a particular level of generality. As an example, a topic of an article, video, or other web content could be characterized at different levels, such as, at a high level, by characterizing the topic as "politics," while, at a lower level," characterizing the topic as "state politics within the state of Missouri." While both are accurate characterizations of the topic of the content and, as such, both dominant entities that may be extracted from the web content, they are dominant entities at different levels of generality. Thus, at operation 404, a dominant entity may be extracted at a particular level of generality. In examples, operation 404 first attempts to extract a dominant entity at the lowest (or lower) levels of generality. For example, in web content discussing apparel, operation 404 may first attempt to identify a particular type of apparel that dominates the content, such as "Women's Trail Running Shoes."

Extracting a dominant entity from web content at operation 404 may involve utilizing machine learning programs or algorithms. The inputs used by these algorithms or programs may include web content elements identified in and/or extracted from the web content, along with particular attributes or properties relating thereto. For example, dominant entity extraction may be based at least in part on the properties of various text elements in the web content, such as a text element that appears at the top of the page in large font and, as such, may be the title of a document. In another example, dominant entity extraction may be based at least in part on properties of image elements in the web content, such as the size and position of the images, along with an analysis of the pixel intensities of the images or results of any image recognition performed on the images. For example, if web content includes several image elements and image recognition indicates that each of the image elements includes an image of a particular product, dominant entity extraction may identify that product as a dominant entity or a dominant entity candidate.

At operation 406, a confidence score for the dominant entity may be determined. In examples, a confidence score represents the strength of the extracted dominant entity relative to other candidate dominant entities. For instance, a high confidence score may be generated when only one candidate dominant entity was identified and several aspects of the web content indicating that dominant entity. Conversely, a low confidence score may be generated when several candidate dominant entities were identified, each having roughly equal indications supporting dominant entity status. A confidence score may be a numerical value or a vector of numerical values characterizing different aspects of confidence in the dominant entity. For example, a confidence score may encompass multiple values, such as one value indicating a confidence based on image elements in the web content and another value indicating a confidence based on text elements in the web content.

At determination 408, it is determined whether the confidence score generated at operation 406 exceeds a threshold. In examples, a threshold is set that indicates a level of confidence that must be met to determine that the extracted dominant entity is a dominant entity of the web content. The threshold may be a static threshold or may be a dynamic threshold that may differ depending on, for example, the number of candidate dominant entities identified, the type of web content being analyzed, the number of web content elements extracted from the web content, or other factors that may influence the level of confidence necessary to identify a dominant entity. Where multiple candidate dominant entities have been identified, each may be compared to the threshold.

If determination 408 is "NO" (i.e., the confidence score does not exceed a threshold), method 400 proceeds to operation 410, where a determination is made whether a higher level is available. As discussed, a dominant entity may be extracted at different levels of generality. In examples, a dominant entity is first extracted at a lower, more specific level. If the confidence score for the lowest level does not exceed a confidence threshold, a dominant entity may nonetheless be extracted at a higher level that does exceed the threshold. Thus, at determination 410, it is determined whether a higher level exists at which a dominant entity may be extracted. In the example previously offered, in which a dominant entity of "Women's Trail Running Shoes" is extracted from an article about apparel, a higher level may be available at which a dominant entity could be extracted, such as a broader product category.

If determination 410 is "YES," flow proceeds to operation 412, and the "level N" at which the dominant entity is extracted increases by one, such that the dominant entity will be extracted at a level of generality one level higher than the previously extracted entity. Flow returns to operation 404 at which a dominant entity is extracted at this higher level. At operation 406, a confidence score is determined for this dominant entity. For example, the web content that produced a dominant entity of "Women's Trail Running Shoes" may, at one level of generality higher, produce a dominant entity of "Women's Athletic Footwear." Or, at an even higher level of generality, the web content may produce a dominant entity of "Women's Athletic Apparel."

The results of the dominant entity extraction at the higher level of generality are again compared to a threshold at determination 408. If the confidence fails again to meet the threshold, flow returns to determination 410 to determine whether yet a higher level is available. At some point, there may not be another higher level at which a dominant entity may be extracted and determination 410 may be "NO." In this case, flow proceeds to operation 414, and it is determined that there is no dominant entity that can be extracted from the web content.

If determination 408 is "YES," (i.e., a confidence score exceeds the threshold), flow proceeds to operation 416, where contextual objects relating to the dominant entity are identified. Identifying contextual objects relating to the dominant entity may involve submitting one or more requests to one or more APIs for data relating to the dominant entity. For instance, for a dominant entity of "Women's Running Shoes," a request may be submitted to a shopping API associate with a shopping data store of shopping data for contextual objects relating to the dominant entity. In such an instance, the shopping API may respond with an identification of contextual objects, such as particular brands or models of women's running shoes available for purchase in a shopping context. The shopping API may further include, in the response, information relating to the contextual objects, such as images of the objects, descriptions of the objects, price history of the objects, and other information that could be stored/provided with the contextual objects.

At operation 418, one or more of the contextual objects identified at operation 416 are stored. As previously discussed, storing contextual objects may involve storing images or text associated with the identified object(s) in association with the web content in a database. In other examples, storing contextual objects may involve storing identifiers for the contextual objects that may be sued to retrieve text/images that can be provided in response to a request for the web content.

At operation 420, one or more of the contextual objects are provided. As previously discussed, providing a contextual object may involve causing the contextual object to be displayed on a computing device alongside the web content to which it is related, such as by displaying an image and description of a product alongside an article discussing the product and/or the category to which the product belongs.

It will be appreciated that method 300, method 400, and/or aspects thereof may be performed in association with the systems and methods described herein, such as at operations 204 or 208 of method 200. For instance, either or both of these methods may be utilized to identify contextual objects for web content. The contextual objects identified by either or both of these methods may further be used to determine personalized contextual objects for web content, such as at operation 218 of method 200. In some circumstances, it may be preferable to perform one of method 300 or method 400 instead of the other based on certain properties of the web content being analyzed. For instance, certain web content may have web content elements that are more amenable to analysis by method 300 than by method 400 or vice versa. In other circumstances, it may be advantageous to perform one of method 300 or method 400 before the other and, based on the results of that analysis, perform the other of the two if the first analysis did not generate a sufficient quality or quantity of contextual objects. In still other examples, both method 300 and method 400 may be performed in parallel or in series and the contextual objects of both analyses used to determine personalized contextual objects based on accessing profile data associated with a request for web content.

FIG. 5 illustrates an example user interface 500 for providing contextual objects with web content. Interface 500 includes a web page 502, such as a web page that may be presented on a display of a computing device. Web page 502 includes web content 504, which is depicted as containing text elements and hyperlink elements. Web page 502 further includes carousel 506 containing objects 508-516, which may be contextual objects identified as being related to web content 504. For example objects 508-516 may be contextual objects based on extracting hyperlink elements from web content 504 and determining objects related to the hyperlink elements. For instance, web content 504 may be an article about a category of products or services, and hyperlink elements in web content 504 may be links to web pages where those products or services can be purchased. In this example, objects 508-516 may include text or images relating to the products or service and may be presented in an object carousel 506. Object carousel 506 may include additional objects that are not pictured but may be viewed by navigating the carousel 506 past the displayed objects. Selection of any of the objects 508-516 may result in web page 502 navigating to a context relating to the selected object, such as a shopping context in which the selected object is available for purchase. Web page 502 may further include, alongside web content 504, banner ads 518 and 520. Banner ads may include advertisements purchased from the provider of web page 502. Unlike objects 508-518, banner ads 518 and 520 may have no relationship to web content 504 and/or to the user viewing web content 504 in web page 502.

Figure 6:
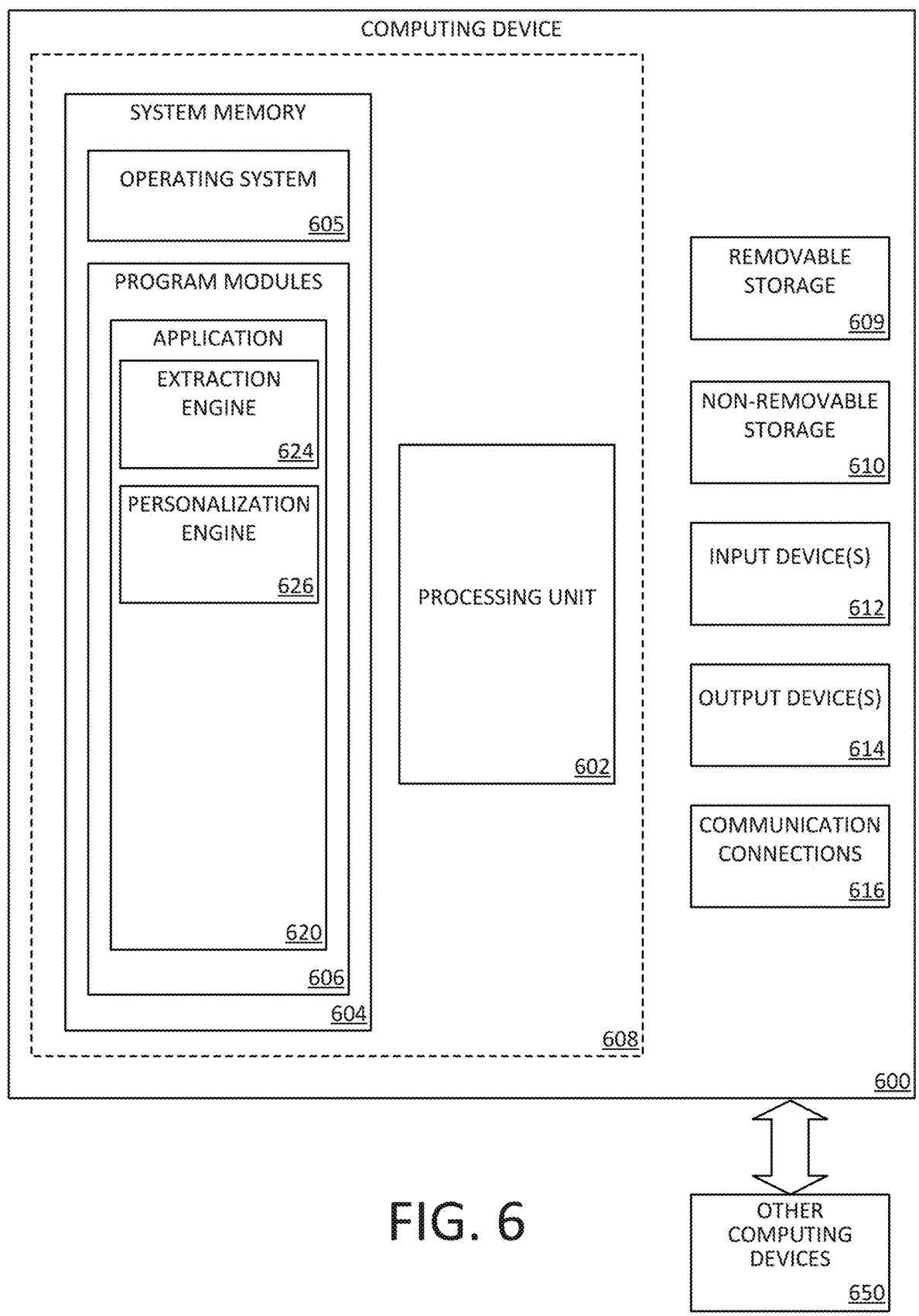
FIG. 6 is a simplified block diagram of a mobile computing device with which aspects of the present disclosure may be practiced.
Figure 7:
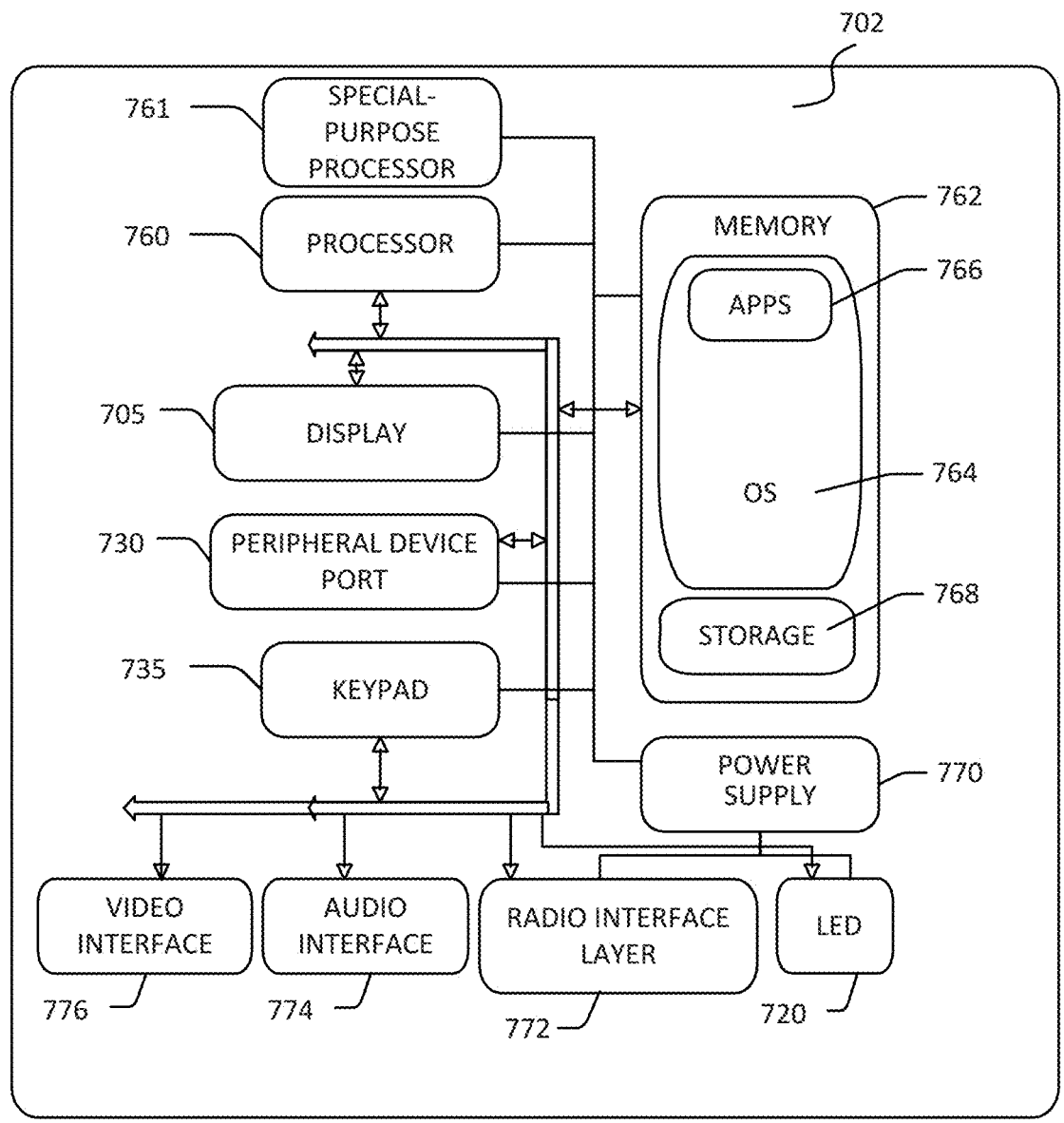
FIG. 7 is a simplified block diagram of a distributed computing system in which aspects of the present disclosure may be practiced.
Figure 8:
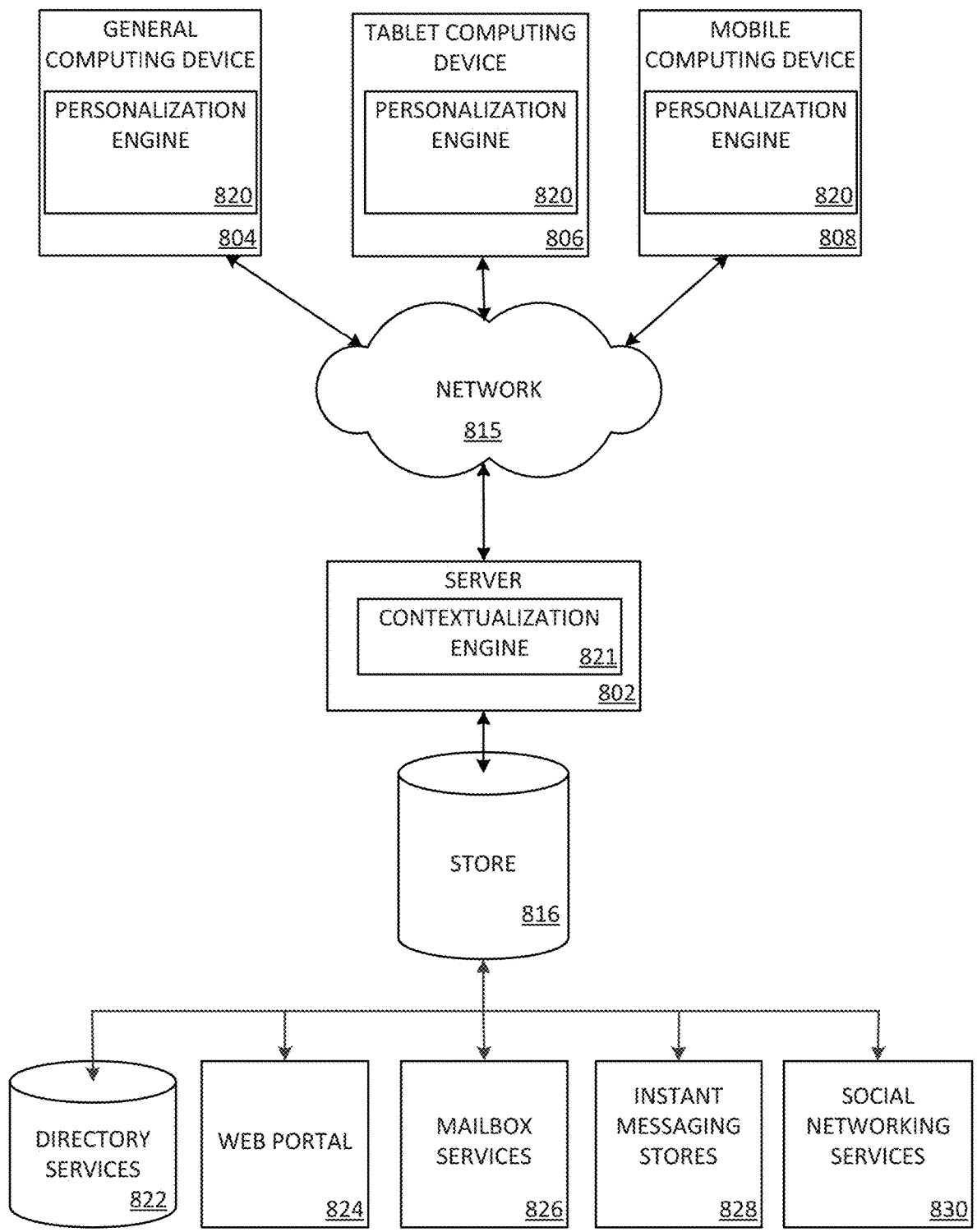
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including elements 102-112 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store interruption detection engine 724 and workflow manager 726. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 8 is a block diagram illustrating the architecture of one aspect of a computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and nut on the mobile computing device 700 described herein (e.g., a signal identification engine, a context determination engine, a semantic action generator, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/ information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A workflow manager 820 may be employed by a client that communicates with server device 802, and/or interruption detection engine 821 may be employed by server device 802. Additionally or alternatively, workflow manager 820 may be employed by server device 802 in combination or in conjunction with interruption detection engine 821. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor and a memory storing a set of instructions that, when executed by the at least one processor, causes the system to perform a set of operations, the set of operations comprising: receive web content, wherein the web content comprises a plurality of elements; determine a plurality of primary contextual objects related to the web content by performing one or more of: a hyperlink extraction operation and a dominant entity extraction operation; wherein the hyperlink extraction operation comprises: parsing the web content to identify the plurality of elements; extracting a plurality of hyperlink elements from the plurality of elements; and determining, based on the plurality of hyperlink elements, the plurality of primary contextual objects; wherein the dominant entity extraction operation comprises: extracting a dominant entity of the web content based on the plurality of elements; and determining the plurality of primary contextual objects based on the dominant entity; store the plurality of primary contextual objects with the web content; and in response to receiving a request for the web content, provide the plurality of primary contextual objects with the requested web content.

In another aspect, the technology relates to A computer-implemented method for providing contextual objects with web content, the method comprising: receiving web content, wherein the web content comprises a plurality of elements; determining a plurality of primary contextual objects related to the web content by performing one or more of: a hyperlink extraction operation and a dominant entity extraction operation; wherein the hyperlink extraction operation comprises: parsing the web content to identify the plurality of elements; extracting a plurality of hyperlink elements from the plurality of elements; and determining, based on the plurality of hyperlink elements, the plurality of primary contextual objects; wherein the dominant entity extraction operation comprises: extracting a dominant entity of the web content based on the plurality of elements; and determining the plurality of primary contextual objects based on the dominant entity; storing the plurality of primary contextual objects with the web content; and in response to receiving a request for the web content, providing the plurality of primary contextual objects with the requested web content.

In a further aspect, the technology relates to a computer-storage medium encoding computer-executable instructions that, when executed by at least one processor, perform a method comprising: receiving web content, wherein the web content comprises a plurality of elements; determining a plurality of primary contextual objects related to the web content by performing one or more of: a hyperlink extraction operation and a dominant entity extraction operation; wherein the hyperlink extraction operation comprises: parsing the web content to identify the plurality of elements; extracting a plurality of hyperlink elements from the plurality of elements; and determining, based on the plurality of hyperlink elements, the plurality of primary contextual objects; wherein the dominant entity extraction operation comprises: extracting a dominant entity of the web content based on the plurality of elements; and determining the plurality of primary contextual objects based on the dominant entity; storing the plurality of primary contextual objects; determining, from the plurality of primary contextual objects, a plurality of personalized contextual objects based on profile data associated with the request for the web content; providing the plurality of personalized contextual objects in an object carousel alongside the requested web content; and based on receiving a selection of one of the plurality of primary contextual objects, providing a web page associated with the selected personalized contextual object.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing a set of instructions that, when executed by the at least one processor, causes the system to perform a set of operations, the set of operations comprising:
        receive web content, wherein the web content comprises a plurality of elements;
        extract, based on the plurality of elements, a first dominant entity of the web content;
        generate a first confidence score for the first dominant entity;
        extract, based on the plurality of elements, a second dominant entity of the web content;
        generate a second confidence score for the second dominant entity;
        if the first confidence score is above a dominant entity confidence threshold, determine a plurality of primary contextual objects based on the first dominant entity; and
        if the first confidence score is below the dominant entity confidence threshold, determine the plurality of primary contextual objects based on the second dominant entity;
        in response to receiving a request for the web content, provide the plurality of primary contextual objects with the requested web content; and
        in response to receiving a selection of one of the plurality of primary contextual objects, navigate to a browsing context associated with the selected primary contextual object.

2. The system of claim 1, wherein the set of instructions further comprises:
    if the plurality of primary contextual objects is below a contextual object threshold, determine a plurality of secondary contextual objects related to the plurality of primary contextual objects; and
    in response to receiving the request for the web content, provide the plurality of secondary contextual objects with the plurality of primary contextual objects and the requested web content.

3. The system of claim 1, the set of operations further comprising:
    determine, from the plurality of primary contextual objects, a plurality of personalized contextual objects based on profile data associated with the request for the web content; and
    provide the plurality of personalized contextual objects with the requested web content.

4. The system of claim 1, wherein the dominant entity confidence threshold is based on a quantity of the plurality of elements used to generate the first dominant entity.

5. The system of claim 1, wherein the first dominant entity is extracted at a first level of generality and the second dominant entity is extracted at a second level of generality and wherein the second level is higher than the first level.

6. The system of claim 5, wherein the first dominant entity is a product and wherein the second dominant entity is a product category encompassing the product.

7. The system of claim 6 wherein at least one of the plurality of elements is an image of the product and wherein extracting the first dominant entity comprises determining that the image depicts the product.

8. The system of claim 1, wherein generating the first confidence score comprises comparing a first quantity of the plurality of elements indicating the first dominant entity to a second quantity of the plurality of elements indicating the second dominant entity.

9. The system of claim 1, the set of operations further comprising:
    parsing the web content;
    extracting, based on the parsing, a plurality of hyperlink elements; and
    identifying at least one of the plurality of primary contextual objects based on the plurality of hyperlink elements.

10. A computer-implemented method for providing contextual objects with web content, the method comprising:
    receiving web content, wherein the web content comprises a plurality of elements;
    extracting a first dominant entity of the web content based on the plurality of elements;
    generating a first confidence score for the first dominant entity;
    extracting a second dominant entity of the web content based on the plurality of elements;
    generating a second confidence score for the second dominant entity;
    if the first confidence score is above a dominant entity confidence threshold, determining a plurality of primary contextual objects based on the first dominant entity; and
    if the first confidence score is below the dominant entity confidence threshold, determining the plurality of primary contextual objects based on the second dominant entity;
    in response to receiving a request for the web content, providing the plurality of primary contextual objects with the requested web content; and
    in response to receiving a selection of one of the plurality of primary contextual objects, navigating to a browsing context associated with the selected primary contextual object.

11. The method of claim 10, wherein the method further comprises:
    determining, from the plurality of contextual objects, a plurality of personalized contextual objects based on profile data associated with the request for the web content; and
    providing the plurality of personalized contextual objects with the requested web content.

12. The method of claim 10, wherein the dominant entity confidence threshold is based on a quantity of the plurality of elements used to generate the first dominant entity.

13. The method of claim 10, wherein the method further comprises:

parsing the web content;
extracting, based on the parsing, a plurality of hyperlink elements; and
identifying at least one of the plurality of primary contextual objects based on the plurality of hyperlink elements.

14. The method of claim 10, wherein the first dominant entity is extracted at a first level of generality and the second dominant entity is extracted at a second level of generality and wherein the second level is a higher than the first level.

15. The method of claim 10, wherein generating the first confidence score comprises comparing a first quantity of the plurality of elements indicating the first dominant entity to a second quantity of the plurality of elements indicating the second dominant entity.

16. The method of claim 10, wherein the method further comprises:
if the plurality of primary contextual objects is below a contextual object threshold, determining a plurality of secondary contextual objects related to the plurality of primary contextual objects; and
in response to receiving the request for the web content, providing the plurality of secondary contextual objects with the plurality of primary contextual objects and the requested web content.

17. A computer-storage medium encoding computer-executable instructions that, when executed by at least one processor, perform a method comprising:
receiving web content, wherein the web content comprises a plurality of elements;
extracting a first dominant entity of the web content based on the plurality of elements;
generating a first confidence score for the first dominant entity;
extracting a second dominant entity of the web content based on the plurality of elements;
generating a second confidence score for the second dominant entity;
if the first confidence score is above a dominant entity confidence threshold, determining a plurality of primary contextual objects based on the first dominant entity; and
if the first confidence score is below the dominant entity confidence threshold, determining the plurality of primary contextual objects based on the second dominant entity;
determining, from the plurality of primary contextual objects, a plurality of personalized contextual objects based on profile data associated with the request for the web content;
providing the plurality of personalized contextual objects with the requested web content; and
in response to receiving a selection of one of the plurality of primary contextual objects, navigating to a browsing context associated with the selected personalized contextual object.

18. The computer-storage medium of claim 17, wherein generating the first confidence score for the first dominant entity comprises:
comparing a first quantity of the plurality of elements indicating the first dominant entity to a second quantity of the plurality of elements indicating the second dominant entity.

19. The computer-storage medium of claim 17, wherein providing the plurality of personalized contextual objects with the requested web content comprises:
ranking, based on the profile data, the plurality of personalized contextual objects; and arranging the plurality of personalized contextual objects based on the ranking.

20. The computer-storage medium of claim 17, wherein the method further comprises:
if the plurality of primary contextual objects is below a contextual object threshold, determining a plurality of secondary contextual objects related to the plurality of primary contextual objects; and
providing the plurality of secondary contextual objects with the plurality of personalized contextual objects.

* * * * *